(12) United States Patent
Wade

(10) Patent No.: US 6,829,096 B1
(45) Date of Patent: Dec. 7, 2004

(54) BI-DIRECTIONAL WAVELENGTH DIVISION MULTIPLEXING/DEMULTIPLEXING DEVICES

(75) Inventor: Robert K. Wade, Boca Raton, FL (US)

(73) Assignee: Confluent Photonics Corporation, Salem, NH (US)

( * ) Notice: Subject to any disclaimer, the term of this patent is extended or adjusted under 35 U.S.C. 154(b) by 1052 days.

(21) Appl. No.: 09/605,162

(22) Filed: Jun. 27, 2000

Related U.S. Application Data

(63) Continuation-in-part of application No. 09/392,831, filed on Sep. 8, 1999, now Pat. No. 6,181,853, and a continuation-in-part of application No. 09/392,670, filed on Sep. 8, 1999, now Pat. No. 6,298,182, and a continuation-in-part of application No. 09/382,624, filed on Aug. 25, 1999, now Pat. No. 6,271,970, and a continuation-in-part of application No. 09/382,492, filed on Aug. 25, 1999, now Pat. No. 6,404,945, and a continuation-in-part of application No. 09/363,042, filed on Jul. 29, 1999, now Pat. No. 6,236,780, and a continuation-in-part of application No. 09/363,041, filed on Jul. 29, 1999, now Pat. No. 6,243,513, and a continuation-in-part of application No. 09/342,142, filed on Jun. 29, 1999, now Pat. No. 6,289,155, and a continuation-in-part of application No. 09/323,094, filed on Jun. 1, 1999, now Pat. No. 6,263,135, and a continuation-in-part of application No. 09/257,045, filed on Feb. 25, 1999, now Pat. No. 6,137,933.

(51) Int. Cl.[7] ........................ G02B 27/14; G02B 27/10; G02B 27/44; G02B 6/28; G02B 6/34

(52) U.S. Cl. ..................... 359/634; 359/618; 359/638; 359/641; 359/566; 359/732; 385/24; 385/34; 385/37; 385/48; 398/87

(58) Field of Search ..................... 359/634, 618, 359/638, 641, 619, 629, 566, 569, 732, 351; 385/24, 33, 37, 10, 14, 34, 48; 398/50, 67, 69, 72, 86, 97

(56) References Cited

U.S. PATENT DOCUMENTS

| | | | |
|---|---|---|---|
| 4,111,524 A | 9/1978 | Tomlinson, III | 350/96.19 |
| 4,153,330 A | 5/1979 | Tomlinson, III | 350/96.17 |
| 4,198,117 A | 4/1980 | Kobayashi | 350/96.19 |
| 4,274,706 A | 6/1981 | Tangonan | 350/96.19 |
| 4,279,464 A | 7/1981 | Colombini | 350/96.19 |
| 4,299,488 A | 11/1981 | Tomlinson, III | 356/328 |
| 4,343,532 A | 8/1982 | Palmer | 350/96.19 |
| 4,387,955 A | 6/1983 | Ludman et al. | 350/96.19 |
| 4,479,697 A | 10/1984 | Kapany et al. | 350/96.18 |
| 4,522,462 A | 6/1985 | Large et al. | 350/96.19 |
| 4,583,820 A | 4/1986 | Flamand et al. | 350/96.19 |
| 4,622,662 A | 11/1986 | Laude et al. | 370/3 |

(List continued on next page.)

OTHER PUBLICATIONS

G. R. Harrison, Ph.D., Sc.D. et al., Practical Spectroscopy, Chapter 4—Diffraction–Grating Spectrographs Prentice Hall (1948).

W. J. Tomlinson, Wavelength multiplexing in multimode optical fibers, Applied Optics, vol. 16, No. 8 (Aug. 1977).

W.J. Tomlinson et al., Optical multiplexer for multimode fiber transmission systems, Appl. Phys. Lett., vol. 31, No. 3 (Aug. 1977).

(List continued on next page.)

*Primary Examiner*—Loha Ben
(74) *Attorney, Agent, or Firm*—Hunton & Williams LLP

(57) ABSTRACT

A bi-directional wavelength division multiplexing/demultiplexing device is disclosed. In an exemplary embodiment, the bi-directional wavelength division multiplexing/demultiplexing device comprises a diffraction grating for combining a plurality of monochromatic optical input beams into a multiplexed, polychromatic optical output beam, and for separating a multiplexed, polychromatic optical input beam into a plurality of monochromatic optical output beams; and a transmissive/reflective optical element for transmitting the plurality of monochromatic optical input beams on an optical path toward the diffraction grating, and for reflecting the plurality of monochromatic optical output beams received on an optical path from the diffraction grating.

32 Claims, 8 Drawing Sheets

U.S. PATENT DOCUMENTS

| | | | |
|---|---|---|---|
| 4,626,069 A | 12/1986 | Dammann et al. | 350/162.2 |
| 4,634,215 A | 1/1987 | Reule | 350/96.16 |
| 4,643,519 A | 2/1987 | Bussard et al. | 350/96.19 |
| 4,652,080 A | 3/1987 | Carter et al. | 350/96.19 |
| 4,671,607 A | 6/1987 | Laude | 350/96.15 |
| 4,703,472 A | 10/1987 | Blumentritt et al. | 370/3 |
| 4,708,425 A | 11/1987 | Gouali et al. | 350/96.16 |
| 4,726,645 A | 2/1988 | Yamashita et al. | 350/96.18 |
| 4,740,951 A | 4/1988 | Lizet et al. | 370/3 |
| 4,741,588 A | 5/1988 | Nicia et al. | 350/96.19 |
| 4,744,618 A | 5/1988 | Mahlein | 350/96.19 |
| 4,746,186 A | 5/1988 | Nicia | 350/96.13 |
| 4,748,614 A | 5/1988 | Dammann et al. | 370/3 |
| 4,749,247 A | 6/1988 | Large | 350/96.16 |
| 4,752,108 A | 6/1988 | Vollmer | 350/96.12 |
| 4,760,569 A | 7/1988 | Mahlein | 350/3 |
| 4,763,969 A | 8/1988 | Khoe et al. | 350/96.19 |
| 4,773,063 A | 9/1988 | Hunsperger et al. | 370/3 |
| 4,786,133 A | 11/1988 | Gidon et al. | 350/96.19 |
| 4,819,224 A | 4/1989 | Laude | 370/3 |
| 4,834,485 A | 5/1989 | Lee | 350/96.19 |
| 4,836,634 A | 6/1989 | Laude | 350/96.19 |
| 4,857,726 A | 8/1989 | Kinney et al. | 250/226 |
| 4,923,271 A | 5/1990 | Henry et al. | 350/96.19 |
| 4,926,412 A | 5/1990 | Jannson et al. | 370/3 |
| 4,930,855 A | 6/1990 | Clark et al. | 350/96.19 |
| 4,934,784 A | 6/1990 | Kapany et al. | 350/96.18 |
| 5,026,131 A | 6/1991 | Jannson et al. | 350/3.7 |
| 5,107,359 A | 4/1992 | Ohuchida | 359/124 |
| 5,170,451 A | 12/1992 | Ohshima | 385/43 |
| 5,228,103 A | 7/1993 | Chen et al. | 385/14 |
| 5,278,687 A | 1/1994 | Jannson et al. | 359/125 |
| 5,355,237 A | 10/1994 | Lang et al. | 359/130 |
| 5,363,220 A | 11/1994 | Kuwayama et al. | 359/3 |
| 5,440,416 A | 8/1995 | Cohen et al. | 359/127 |
| 5,442,472 A | 8/1995 | Skrobko | 359/110 |
| 5,450,510 A | 9/1995 | Boord et al. | 385/37 |
| 5,457,573 A | 10/1995 | Iida et al. | 359/569 |
| 5,500,910 A | 3/1996 | Boudreau et al. | 385/24 |
| 5,513,289 A | 4/1996 | Hosokawa et al. | 385/33 |
| 5,526,155 A | 6/1996 | Knox et al. | 359/130 |
| 5,541,774 A | 7/1996 | Blankenbecler | 359/653 |
| 5,555,334 A | 9/1996 | Ohnishi et al. | 385/37 |
| 5,583,683 A | 12/1996 | Scobey | 359/127 |
| 5,606,434 A | 2/1997 | Feldman et al. | 359/3 |
| 5,657,406 A | 8/1997 | Ball | 385/24 |
| 5,703,722 A | 12/1997 | Blankenbecler | 359/653 |
| 5,742,416 A | 4/1998 | Mizrahi | 359/134 |
| 5,745,270 A | 4/1998 | Koch | 359/124 |
| 5,745,271 A | 4/1998 | Ford et al. | 359/130 |
| 5,745,612 A | 4/1998 | Wang et al. | 385/24 |
| 5,748,350 A | 5/1998 | Pan et al. | 359/130 |
| 5,748,815 A | 5/1998 | Hamel et al. | 385/37 |
| 5,768,450 A | 6/1998 | Bhagavatula | 385/24 |
| 5,777,763 A | 7/1998 | Tomlinson, III | 359/130 |
| 5,880,834 A | 3/1999 | Chrisp | 356/328 |
| 5,999,672 A * | 12/1999 | Hunter et al. | 385/37 |
| 6,011,884 A * | 1/2000 | Dueck et al. | 385/24 |
| 6,011,885 A * | 1/2000 | Dempewolf et al. | 385/34 |
| 6,487,016 B1 * | 11/2002 | Shiono et al. | 359/566 |

OTHER PUBLICATIONS

W. J. Tomlinson et al., Optical wavelength–division–multiplexer for the 1–1.4 μm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM system in the 0.8 μm wavelength region, Applied Optics, vol. 18, No. 16 (Aug. 15, 1979).

R. Watanabe et al., Optical Demuliplexer Using Concave Grating in 0.7–0.9 um Wavelength Region, Electronics Letters, vol. 16, No. 3 (Jan. 31, 1980).

K. Kobayashi et al., Microoptic Grating Multiplexers and Optical Isolators for Fibers–Optic Communications, Journal of Quantum Electronics, vol. QE–16, No. 1 (Jan. 1980).

Y. Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communication systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexing with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing Technology and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi/Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Grating Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channel spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplexer for Application in Densely-Spaced, Subnanometer Wavelength Routed Optical Networks, IEEE Electronic Letters, vol. 31, No. 16, pp. 1368–1370 (Aug. 1995).

D. Wisely, High performance 32 channel HDWDM multiplexer with 1nm channels spacing and 0.7nm bandwidth, SPIE, vol. 1578, Fiber Networks of Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Diffraction Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6um Band Using a Small Focusing Parameter Graded—Index Rod Lens, Electronics Letters, vol. 18, No. 6 (Mar. 18, 1982).

A. Koonen, A Compact Wavelength Demultiplexer Using Both Interference Filters and a Diffraction Grating, European Conference of Optical Communication, Conference Proceedings (Sep. 8–11, 1981).

J. Conradi et al., Laser Based WDM Multichannel Video Transmission System, Electronic Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabrication of Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength demultiplexer using substrate guided waves in conjunction with numtiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communication–ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol. 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D.R. Wisely, 32 Channel WDM Multiplexer with 1nm Channel Spacing and 0.7 nm Bandwidth, Electronics Letters, vol. 27, No. 6, pp. 520–521 (Mar. 14, 1991).

C. Koeppen, et al., High Resolution Fiber Grating Optical Network Monitor, National Fiber Optic Engineers Conference, Technical Proceedings, vol. II (Sep. 13–17, 1998).

M.J. Cohen, et al. InGaAs photodiode arrays for DWDM monitoring and receiving, Lightwave, pp. 99–101 (Aug. 1999).

J.P. Laude, Wavelength Division Multiplexing, pp. 116–117, (1993).

Sami Hendow, et al., Performance Monitors Enable Remote Channel Management, Lightwave Special Reports, pp. 62–66 and 72 (Feb. 2000).

Adrian Meldrum, C– and L–band Channel Monitoring, Lightwave Special Reports, pp. 68–72 (Feb. 2000).

* cited by examiner

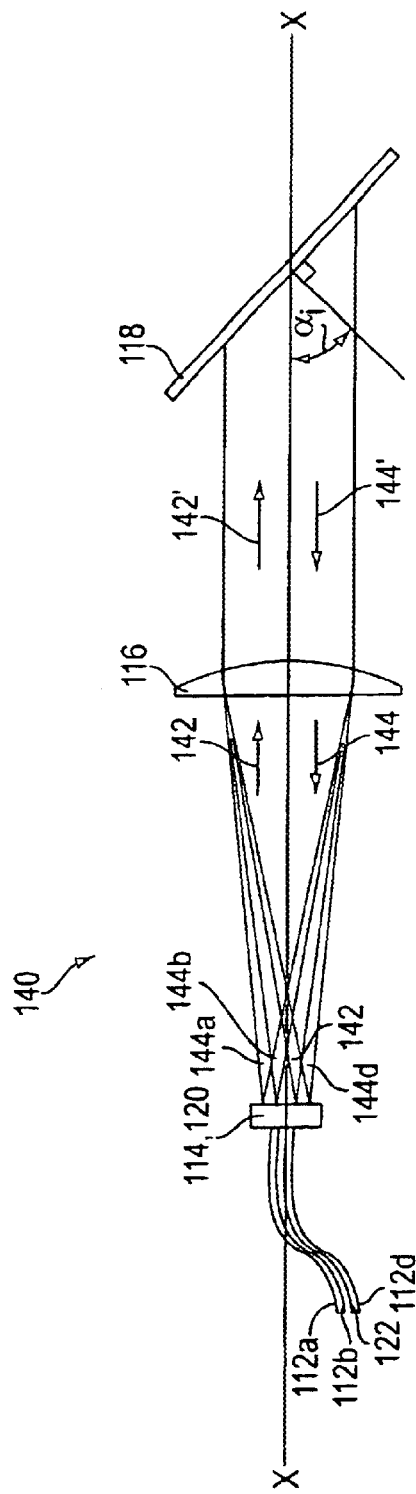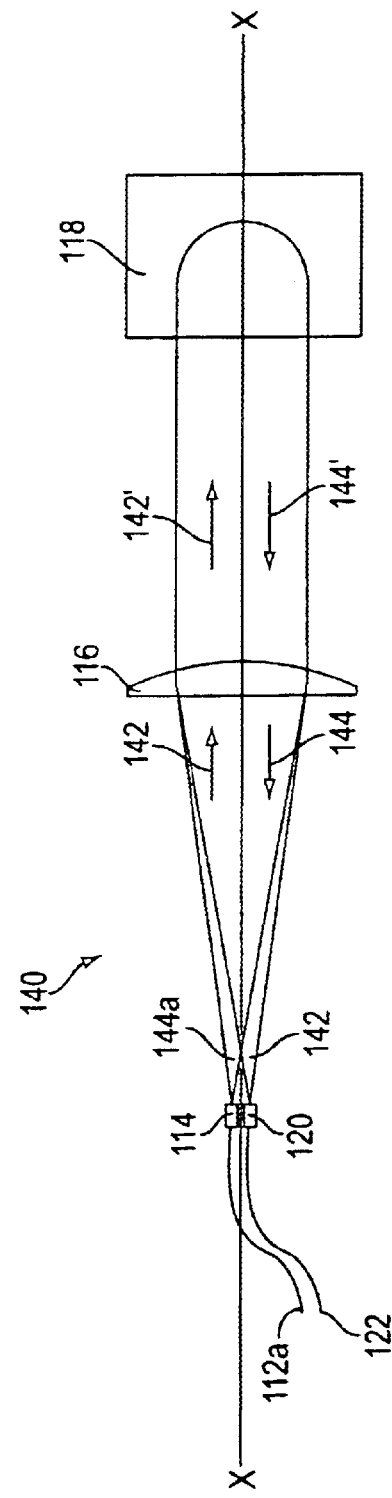

BI-DIRECTIONAL WAVELENGTH DIVISION MULTIPLEXING/DEMULTIPLEXING DEVICES

CROSS-REFERENCE TO RELATED APPLICATIONS

This patent application is a continuation-in-part application of U.S. patent application Ser. No. 09/257,045 filed Feb. 25, 1999, now U.S. Pat. No. 6,137,933; U.S. patent application Ser. No. 09/323,094, filed Jun. 1, 1999, now U.S. Pat. No. 6,263,135; U.S. patent application Ser. No. 09/342,142, filed Jun. 29, 1999, now U.S. Pat. No. 6,289,155; U.S. patent application Ser. No. 09/382,492 filed Aug. 25, 1999, now U.S. Pat. No. 6,404,945; U.S. patent application Ser. No. 09/382,624 filed Aug. 25, 1999, now U.S. Pat. No. 6,271,970; U.S. patent application Ser. No. 09/363,041, filed Jul. 29, 1999, now U.S. Pat. No. 6,243,513; U.S. patent application Ser. No. 09/363,042 filed Jul. 29, 1999, now U.S. Pat. No. 6,236,780; U.S. patent application Ser. No. 09/392,670, filed Sep. 8, 1999, now U.S. Pat. No. 6,298,182; and U.S. patent application Ser. No. 09/392,831, filed Sep. 8, 1999, now U.S. Pat. No. 6,181,853; all of which are hereby incorporated by reference herein in their entirety.

FIELD OF THE INVENTION

The present invention relates generally to wavelength division multiplexing and demultiplexing and, more particularly, to bi-directional wavelength division multiplexing/demultiplexing devices.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels into and out of, respectively, an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

Currently, the commercial use of WDM systems is mainly for long haul, point-to-point telecommunication applications. Such WDM systems are typically only uni-directional traffic systems as the cost and complexity of implementing bi-directional WDM traffic systems is presently quite high. For example, two sets of unique WDM devices are typically required to implement bi-directional WDM traffic systems. That is, one WDM device in each set is typically used for multiplexing a plurality of monochromatic beams from a laser diode array or other optical sources to a single output fiber. Another WDM device in each set is typically used in the opposite direction for demultiplexing a polychromatic beam from a single input fiber to a photodetector array or a plurality of output fibers.

Due the above-described cost and complexity associated with implementing bi-directional WDM traffic systems, it is easily understandable that it would be very desirable to provide bi-directional WDM devices to increase the utility of WDM systems. This increase in utility is particularly important for using WDM technology in local area network (LAN) systems, which are increasingly in need of additional bandwidth and typically operate in environments having shorter distances than long haul, point-to-point telecommunication applications. Also, the use of WDM technology allows a significant increase in the amount of information that can be transferred over an optical fiber. However, system size and cost are critical factors in LAN systems. Thus, as of today, the use of WDM technology for LAN-type networks has not occurred due to the high cost and complexity of WDM systems. However, it is predicted that the ever-increasing need for bandwidth will make the use of WDM-based LAN systems very attractive within the next ten years.

In view of the foregoing, it would be desirable to provide bi-directional WDM devices which overcome the above-described inadequacies and shortcomings. More particularly, it would be desirable to provide bi-directional WDM devices for use in implementing bi-directional WDM traffic systems in an efficient and cost effective manner.

OBJECTS OF THE INVENTION

The primary object of the present invention is to provide bi-directional WDM devices for use in implementing bi-directional WDM traffic systems in an efficient and cost effective manner.

The above-stated primary object, as well as other objects, features, and advantages, of the present invention will become readily apparent to those of ordinary skill in the art from the following summary and detailed descriptions, as well as the appended drawings. While the present invention is described below with reference to preferred embodiment(s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, a bi-directional wavelength division multiplexing/demultiplexing device is provided. In a first exemplary embodiment, the bi-directional wavelength division multiplexing/demultiplexing device comprises a diffraction grating for combining a plurality of monochromatic optical input beams into a multiplexed, polychromatic optical output beam, and for separating a multiplexed, polychromatic optical input beam into a plurality of monochromatic optical output beams; and a transmissive/reflective optical element for transmitting the plurality of monochromatic optical input beams on an optical path toward the diffraction grating, and for reflecting the plurality of monochromatic optical output beams received on an optical path from the diffraction grating.

In accordance with other aspects of the present invention, the diffraction grating may be a transmissive diffraction grating. If such is the case, the bi-directional wavelength division multiplexing/demultiplexing device further beneficially comprises a first collimating/focusing lens for collimating the plurality of monochromatic optical input beams, and for focusing the multiplexed, polychromatic optical output beam; and a second collimating/focusing lens for collimating the multiplexed, polychromatic optical input beam, and for focusing the plurality of monochromatic optical output beams. Then, the transmissive/reflective optical element is preferably located opposite either the first collimating/focusing lens or the second collimating/focusing lens from the diffraction grating. Alternatively, the transmissive/reflective optical element may be located between the diffraction grating and either the first collimating/focusing lens or the second collimating/focusing lens.

In accordance with other aspects of the present invention, the diffraction grating may instead be a reflective diffraction grating. If such is the case, the bi-directional wavelength division multiplexing/demultiplexing device further beneficially comprises a collimating/focusing lens for collimating the plurality of monochromatic optical input beams and the multiplexed, polychromatic optical input beam, and for focusing the multiplexed, polychromatic optical output beam and the plurality of monochromatic optical output beams, respectively. Then, the transmissive/reflective optical element is preferably located opposite the collimating/focusing lens from the diffraction grating. Alternatively, the transmissive/reflective optical element may be located between the diffraction grating and the collimating/focusing lens.

In accordance with further aspects of the present invention, the transmissive/reflective optical element is either a passive optical element or an active optical element. For example, the transmissive/reflective optical element may be a passive beamsplitter having a 45 degree reflecting angle and a fixed transmission/reflection ratio. Alternatively, for example, the transmissive/reflective optical element could be an active electrooptical element also having a 45 degree reflecting angle, but with a variable transmission/reflection ratio.

In a second exemplary embodiment, the bi-directional wavelength division multiplexing/demultiplexing device comprises a diffraction grating for combining a plurality of monochromatic optical input beams into a multiplexed, polychromatic optical output beam, and for separating a multiplexed, polychromatic-optical input beam into a plurality of monochromatic optical output beams; and a transmissive/reflective optical element for reflecting the plurality of monochromatic optical input beams on an optical path toward the diffraction grating, and for transmitting the plurality of monochromatic optical output beams received on an optical path from the diffraction grating.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a perspective end view of a portion of the wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 5b is a top view of the wavelength division multiplexing device shown in FIG. 5a.

FIG. 5c is a perspective end view of a portion of the wavelength division multiplexing device shown in FIG. 5a.

FIG. 6a is a side view of a wavelength division demultiplexing device having a plano-convex collimating/focusing lens and a reflective diffraction grating.

FIG. 6b is a top view of the wavelength division multiplexing device shown in FIG. 6a.

FIG. 7b is a top view of the bi-directional wavelength division multiplexing/demultiplexing device shown in FIG. 7a.

DETAILED DESCRIPTION OF EXEMPLARY EMBODIMENT(S)

Figure 1A:
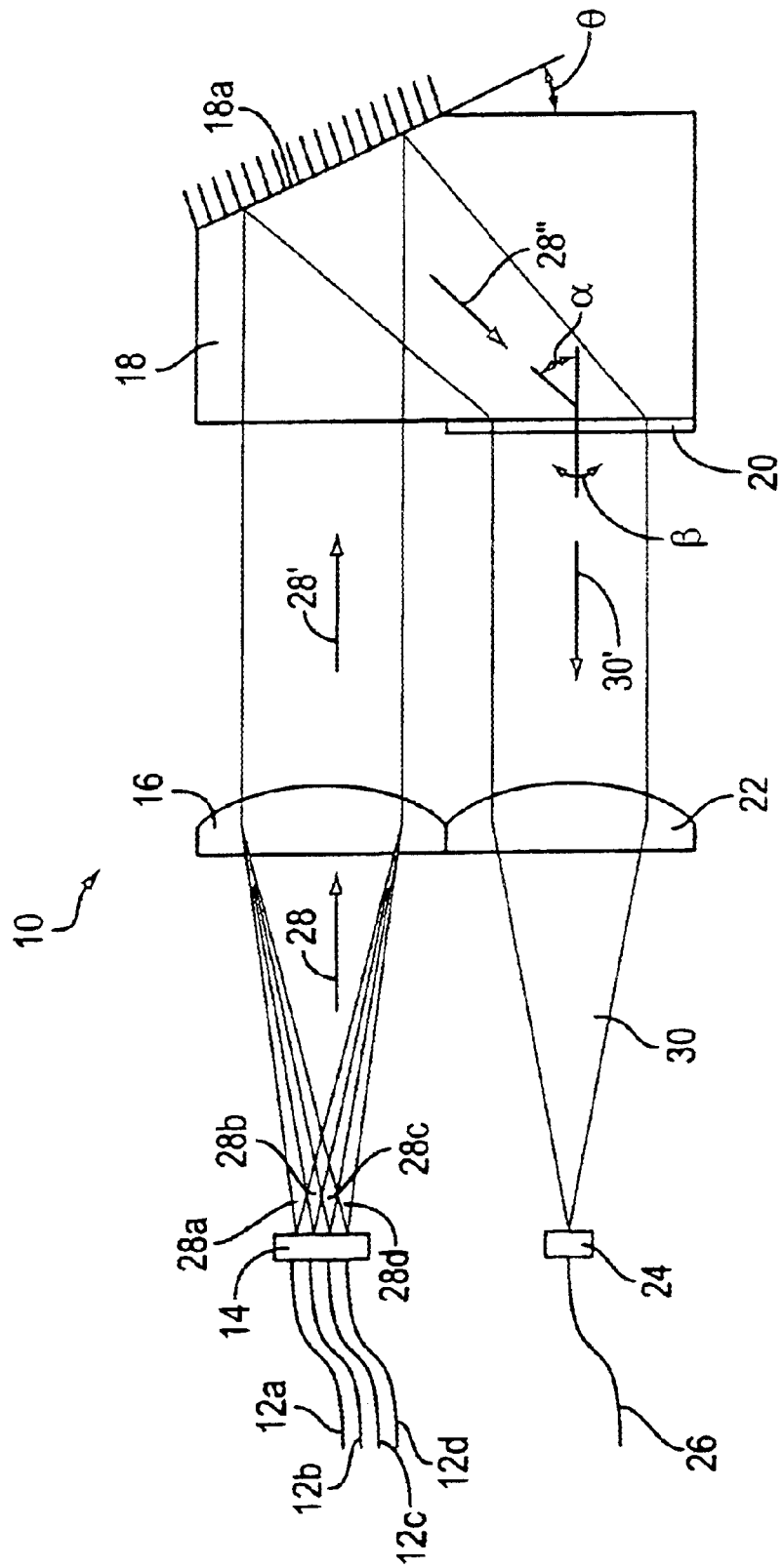
FIG. 1a is a side view of a wavelength division multiplexing device having dual plano-convex collimating/focusing lenses and a transmissive diffraction grating.

Referring to FIG. 1a, there is shown a side view of an embodiment of a wavelength division multiplexing device 10. The multiplexing device 10 comprises a plurality of optical input fibers 12, an input fiber coupling device 14, a plano-convex collimating lens 16, a reflecting element 18 having a reflecting surface 18a, a transmissive diffraction grating 20, a plano-convex focusing lens 22, an output fiber coupling device 24, and a single optical output fiber 26.

At this point it should be noted that the optical input fibers 12 and the optical output fiber 26, as well as any other optical fibers described herein as being used in conjunction with WDM devices, are single mode optical fibers. Of course, however, this does not limit the present invention WDM devices to use with only single mode optical fibers. For example, the present invention WDM devices can also be used with multimode optical fibers.

It should also be noted that the multiplexing device 10, as well as any other WDM devices described herein, is operating in the infrared (IR) region of the electromagnetic spectrum as a dense wavelength division multiplexing (DWDM) device (i.e., operating with data channels having channel spacings of 1 nm or less). Of course, however, this does not limit the present invention WDM devices to being only DWDM devices. For example, the present invention WDM devices can also be standard WDM devices (i.e., operating with data channels having channel spacings greater than 1 nm).

Figure 1B:
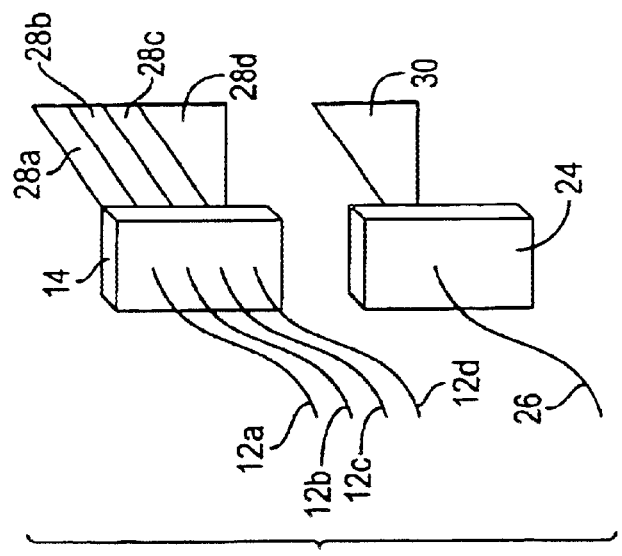

Returning to FIG. 1a, the plurality of optical input fibers 12 are grouped into a one-dimensional input fiber array (i.e., a 1×4 array) by the input fiber coupling device 14, while the single optical output fiber 26 is secured to the output fiber coupling device 24. Both the input fiber coupling device 14 and the output fiber coupling device 24 are used for purposes of ease of optical fiber handling and precision placement, and can be formed of, for example, a silicon v-groove assembly. Referring to FIG. 1b, there is shown a perspective end view of a portion of the multiplexing device 10 revealing how the plurality of optical input fibers 12 are grouped into the one-dimensional input fiber array by the input fiber coupling device 14, and how the single optical output fiber 26 is secured to the output fiber coupling device 24. FIG. 1b also shows a monochromatic optical input beam 28 being transmitted from each of the plurality of optical input fibers 12, and a single multiplexed, polychromatic optical output beam 30 being transmitted to the single optical output fiber 26.

Each of the monochromatic optical input beams 28 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 28 is superimposed on each corresponding unique wavelength by means (e.g., laser diodes connected to the plurality of optical input fibers 12), which are not shown here and which do not form a part of the present invention, but are well known in the art. The unique wavelengths of the monochromatic optical input beams 28 are appropriately preselected such that the data channels do not interfere with each other (i.e., there is sufficient channel spacing), and the optical transmission losses through both the optical input fibers 12 and the optical output fiber 26 are low, as is also well known in the art.

The single multiplexed, polychromatic optical output beam being transmitted to the single optical output fiber 26 is carrying a plurality of channels of data at the unique wavelengths of each of the plurality of monochromatic optical input beams 28. The plurality of monochromatic optical input beams 28 are combined into the single multiplexed, polychromatic optical output beam 30 through the combined operation of the plano-convex collimating lens 16, the transmissive diffraction grating 20, and the plano-convex focusing lens 22, as will be described in more detail below.

Referring again to FIG. 1a, each of the plurality of monochromatic optical input beams 28 are transmitted from their corresponding optical input fiber 12 into the air space between the input fiber coupling device 14 and the plano-convex collimating lens 16. Within this air space, the plurality of monochromatic optical input beams 28 are expanded in diameter until they become incident upon the plano-convex collimating lens 16. The plano-convex collimating lens 16 collimates each of the plurality of monochromatic optical input beams 28, and then transmits each of a plurality of collimated, monochromatic optical input beams 28' to the reflecting element 18.

The reflecting element 18 is fabricated of a transmissive material such as, for example, a standard optical glass material like BK7 (manufactured by Schott Glass Technologies, Inc. with n=1.501@ 1550 nm). Thus, each of the plurality of collimated, monochromatic optical input beams 28' is transmitted through the reflecting element 18 toward the reflecting surface 18a, which is formed at a reflecting angle, θ, on a beveled edge of the reflecting element 18. The reflecting surface 18a reflects each of the plurality of collimated, monochromatic optical input beams 28' such that a plurality of reflected, collimated, monochromatic optical input beams 28" are transmitted through the reflecting element 18 toward the transmissive diffraction grating 20. The reflecting angle, θ, is chosen based upon the desired center wavelength diffraction angle of the transmissive diffraction grating 20, as will be described in more detail below.

The transmissive diffraction grating 20 operates to angularly disperse the plurality of reflected, collimated, monochromatic optical input beams 28" by an amount that is dependent upon the wavelength of each of the plurality of reflected, collimated, monochromatic optical input beams 28". That is, the transmissive diffraction grating 20 operates according to the well known diffraction grating equation, $$m\lambda = d(\sin \alpha + \sin \beta)$$

wherein m is the diffraction order, λ is the wavelength, d is the diffraction grating groove spacing, α is the incident angle with respect to the diffraction grating normal, and β is the diffraction angle with respect to the diffraction grating normal. For the multiplexing device 10 shown in FIG. 1a, the diffraction angle, β, is desired to be 0°, so the incident angle, α, is equal to 45° for a center wavelength of 1550 nm and a diffraction grating having an order of 1 and a groove spacing of 0.65 μm. The reflecting angle, θ, is equal to one-half of the incident angle, α, for the multiplexing device 10 shown in FIG. 1a. So the reflecting angle, θ, is equal to 22.5° for the multiplexing device 10 shown in FIG. 1a. Of course, the present invention is not limited to the values just described as they are provided for purposes of illustration only.

At this point it should be noted that the transmissive diffraction grating 20 can be formed from a variety of materials and by a variety of techniques. For example, the transmissive diffraction grating 20 can be formed by a three-dimensional hologram in a polymer medium, or by replicating a mechanically ruled master with a polymer material. The transmissive diffraction grating 20 could then be joined or affixed to the surface of the reflecting element 18 using optical cement or some other optically transparent bonding technique. Alternatively, the transmissive diffraction grating 20 can be formed directly on the surface of the reflecting element 18, thereby avoiding the joining or affixing of the transmissive diffraction grating 20 to the surface of the reflecting element 18.

As previously mentioned, the transmissive diffraction grating 20 operates to angularly disperse the plurality of reflected, collimated, monochromatic optical input beams 28". Thus, the transmissive diffraction grating 20 removes the angular separation of the plurality of reflected, collimated, monochromatic optical input beams 28", and transmits a single collimated, polychromatic optical output beam 30' towards the plano-convex focusing lens 22. The single collimated, polychromatic optical output beam 30' contains each of the unique wavelengths of the plurality of reflected, collimated, monochromatic optical input beams 28". Thus, the single collimated, polychromatic optical output beam 30' is a single collimated, multiplexed, polychromatic optical output beam 30'. The plano-convex focusing lens 22 focuses the single collimated, multiplexed, polychromatic optical output beam 30', and then transmits the resulting single multiplexed, polychromatic optical output beam 30 to the output fiber coupling device 24 where it becomes incident upon the single optical output fiber 26. The single multiplexed, polychromatic optical output beam 30 is then coupled into the single optical output fiber 26 for transmission therethrough.

At this point it should be noted that the plano-convex collimating lens 16 and the plano-convex focusing lens 22, as well as any other collimating/focusing lens described herein as being used in WDM devices, may be spherical or aspherical in shape. Although spherical lenses are more common than aspherical lenses, mainly due to the fact that they are easier to manufacture, the performance of a WDM device may be further improved by using an aspherical collimating/focusing lens instead of a spherical collimating/focusing lens. That is, the curvature at the edges of an aspherical collimating/focusing lens is less steep than the curvature at the edges of a spherical collimating/focusing lens, thereby resulting in reductions in the level of spherical aberrations in a WDM device incorporating such an aspherical collimating/focusing lens.

At this point it should also be noted that the plano-convex collimating lens 16 and the plano-convex focusing lens 22, as well as any other collimating/focusing lens described herein as being used in WDM devices, is typically coated with an anti-reflection material.

Figure 2A:
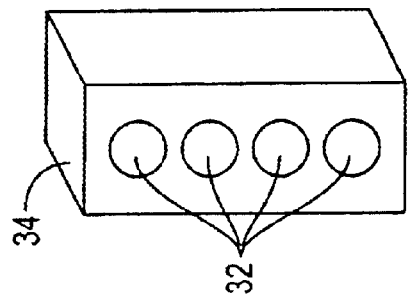

At this point it should be noted that the plurality of optical input fibers 12 could be replaced in the multiplexing device 10 by a corresponding plurality of laser diodes 32 secured within a coupling device 34, such as shown in FIG. 2a. The coupling device 34 performs a similar function to the input fiber coupling device 14, that being to precisely group the plurality of laser diodes 32 into a one-dimensional input array. The plurality of laser diodes 32 are used in place of the plurality of optical input fibers 12 to transmit the plurality of monochromatic optical input beams 28 to the multiplexing device 10. The array of laser diodes 32 may operate alone, or may be used with appropriate focusing lenses to provide the best coupling and the lowest amount of signal loss and channel crosstalk.

Figure 3:
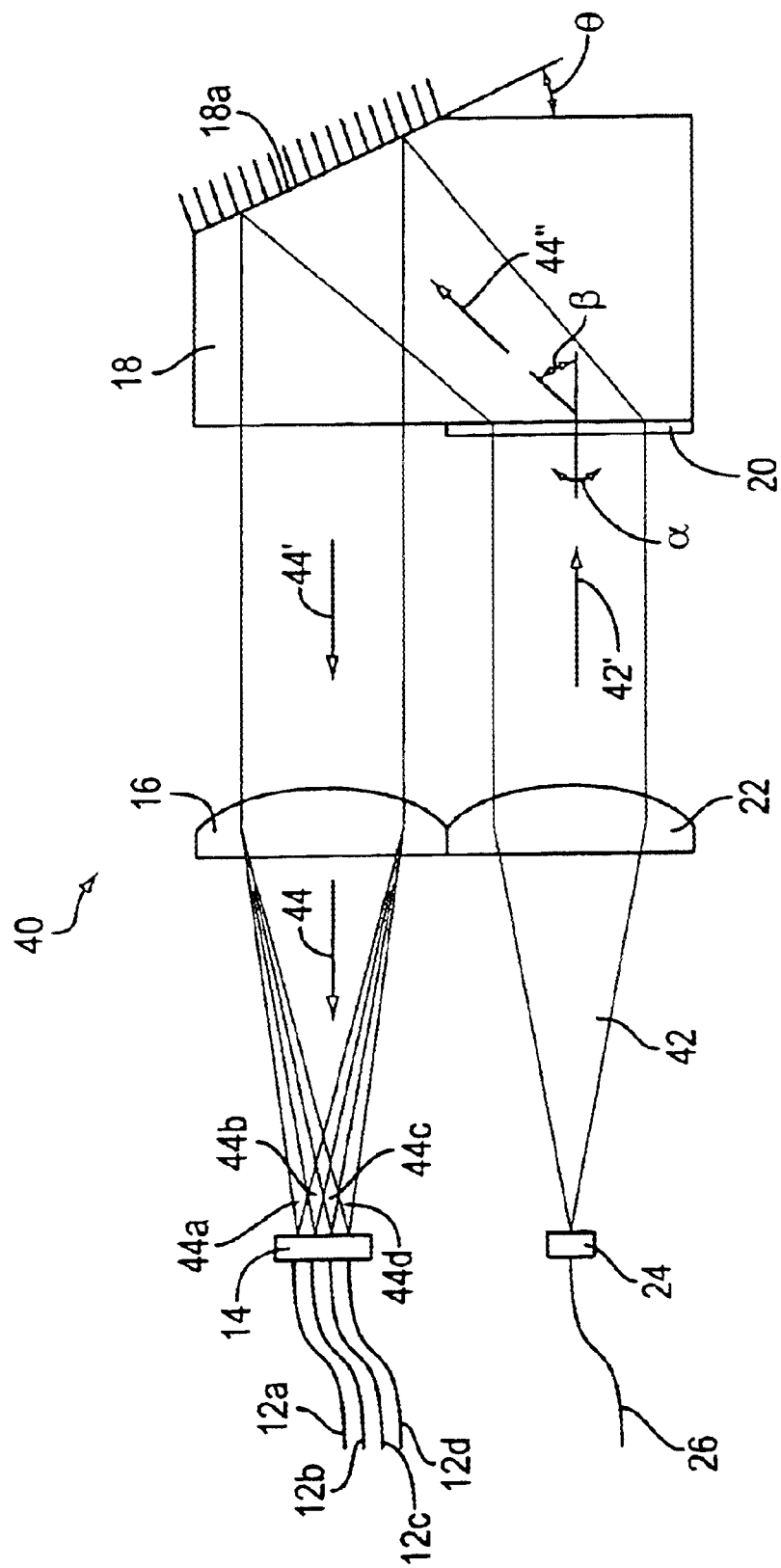
FIG. 3 is a side view of a wavelength division demultiplexing device having dual plano-convex collimating/focusing lenses and a transmissive diffraction grating.

At this point it should be noted that the multiplexing device 10, as well as all of the multiplexing devices described herein, may be operated in a converse configuration as a demultiplexing device 40, such as shown in FIG. 3. The demultiplexing device 40 is physically identical to the multiplexing device 10, and is therefore numerically identified as such. However, the demultiplexing device 40 is functionally opposite to the multiplexing device 10, wherein the plano-convex collimating lens 16 now functions as a plano-convex focusing lens 16 and the plano-convex focusing lens 22 now functions as a plano-convex collimating lens 22. That is, a single multiplexed, polychromatic optical input beam 42 is transmitted from the single optical fiber 26, and a plurality of monochromatic optical output beams 44 are transmitted to the plurality of optical fibers 12, wherein each one of the plurality of monochromatic optical output beams 44 is transmitted to a corresponding one of the plurality of optical fibers 12. The single multiplexed, polychromatic optical input beam 42 is simultaneously carrying a plurality of channels of data, each at a unique wavelength which is preferably, but not required to be, within the infrared (IR) region of the electromagnetic spectrum. The plurality of monochromatic optical output beams 44 are each carrying a single channel of data at a corresponding one of the unique wavelengths of the single multiplexed, polychromatic optical input beam 42. In this case, the single multiplexed, polychromatic optical input beam 42 is separated into the plurality of monochromatic optical output beams 44 through the combined operation of the plano-convex collimating lens 22, the transmissive diffraction grating 20, and the plano-convex focusing lens 16. That is, the plano-convex collimating lens 22 collimates the single multiplexed, polychromatic optical input beam 42 to provide a single collimated, multiplexed, polychromatic optical input beam 42'. The transmissive diffraction grating 20 spatially separates the single collimated, multiplexed, polychromatic optical input beam 42' into a plurality of collimated, monochromatic optical output beams 44", which are reflected off the reflecting surface 18a to provide a plurality of reflected, collimated, monochromatic optical output beams 44'. The plano-convex focusing lens 16 focuses the plurality of reflected, collimated, monochromatic optical output beams 44' to provide the plurality of monochromatic optical output beams 44. Thus, the plano-convex collimating lens 22, the transmissive diffraction grating 20, and a plano-convex focusing lens 16 operate to perform a demultiplexing function. Of course, in this case, the incident angle, a, and the diffraction angle, β, are reversed in comparison to the multiplexing device 10 shown in FIG. 1a, and the reflecting angle, θ, is equal to one-half of the diffraction angle, β.

Figure 2B:
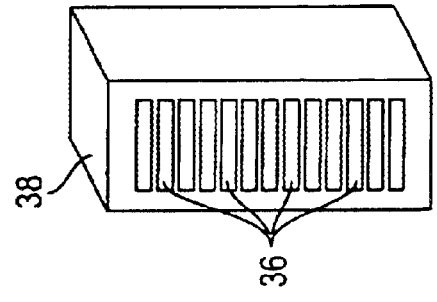
FIG. 2b is a perspective view of a coupling device containing a plurality of photodetectors for replacing the plurality of optical input fibers in the demultiplexing device shown in FIG. 3.

At this point it should be noted that the plurality of optical fibers 12 could be replaced in the demultiplexing device 40 by a corresponding plurality of photodetectors 36 secured within a coupling device 38, such as shown in FIG. 2b. The coupling device 38 performs a similar function to the fiber coupling device 14, that being to precisely group the plurality of photodetectors 36 into a one-dimensional output array. The plurality of photodetectors 36 are used in place of the plurality of optical fibers 12 to receive the plurality of monochromatic optical output beams 44 from the demultiplexing device 40. The array of photodetectors 36 may operate alone, or may be used with appropriate focusing lenses to provide the best coupling and the lowest amount of signal loss and channel crosstalk.

Figure 4:
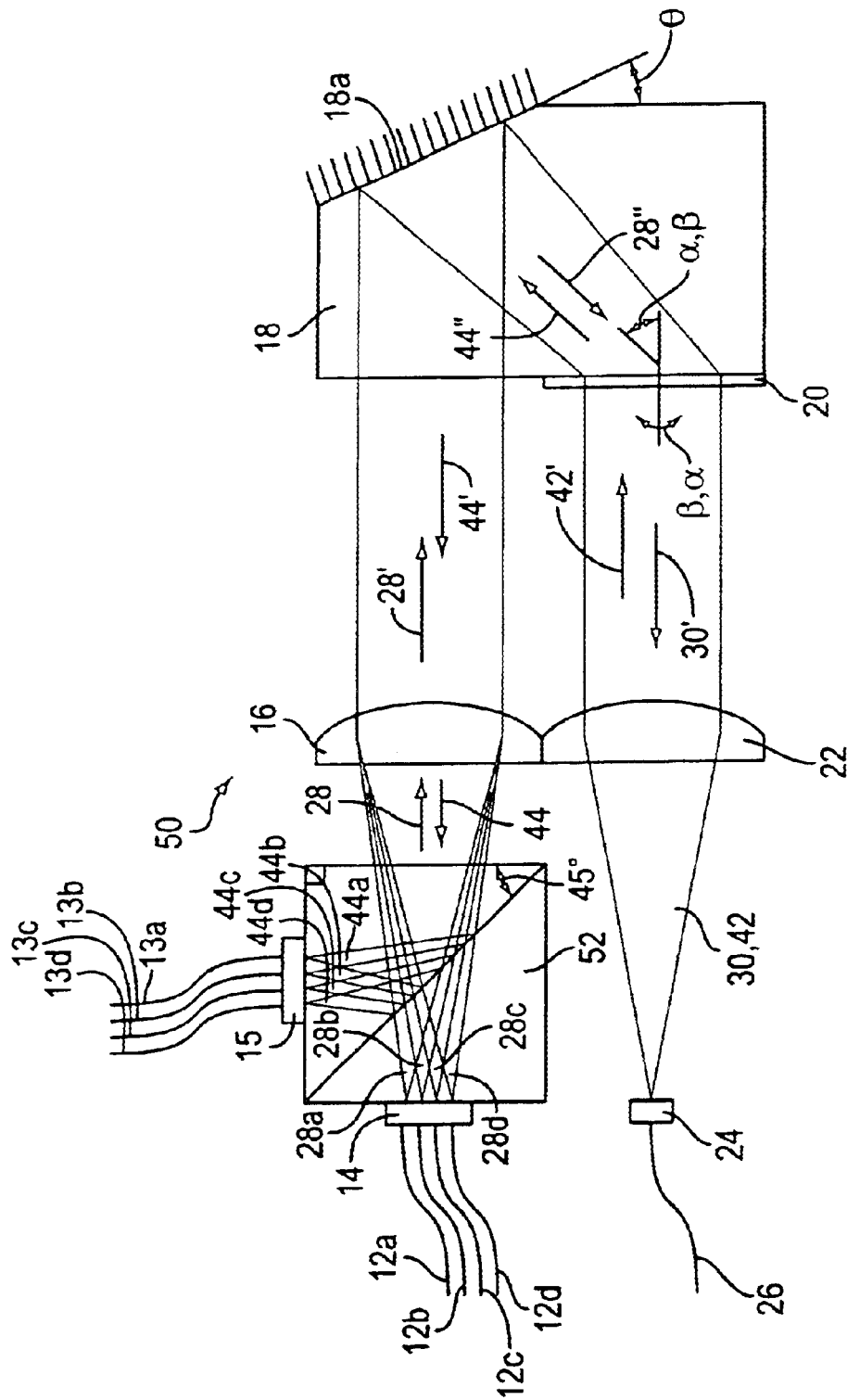
FIG. 4 is a side view of a bi-directional wavelength division multiplexing/demultiplexing device having dual plano-convex collimating/focusing lenses and a transmissive diffraction grating in accordance with the present invention.

Referring to FIG. 4, there is shown a side view of an embodiment of a bi-directional wavelength division multiplexing/demultiplexing device 50 in accordance with the present invention. The multiplexing/demultiplexing device 50 is physically identical to the multiplexing device 10 and the demultiplexing device 40, except for the addition of a transmissive/reflective optical element 52, an output fiber coupling device 15, and a plurality of optical output fibers 13.

The transmissive/reflective optical element 52 operates by transmitting at least a portion of the plurality of monochromatic optical input beams 28, thereby allowing the multiplexing/demultiplexing device 50 to function as a multiplexing device. That is, at least a portion of the plurality of monochromatic optical input beams 28 are transmitted through the transmissive/reflective optical element 52 so that they can then be multiplexed into the single multiplexed, polychromatic optical output beam 30 through the combined operation of the plano-convex collimating lens 16, the transmissive diffraction grating 20, and the plano-convex focusing lens 22. Of course, similar to the multiplexing device 10 shown in FIG. 1, the input fiber coupling device 14 and the plurality of optical input fibers 12 could be replaced in the multiplexing/demultiplexing device 50 by a corresponding plurality of laser diodes 32 secured within a coupling device 34, such as shown in FIG. 2a.

The transmissive/reflective optical element 52 also operates by reflecting at least a portion of the plurality of monochromatic optical output beams 44, thereby allowing the multiplexing/demultiplexing device 50 to function as a demultiplexing device. That is, after the single multiplexed, polychromatic optical input beam 42 has been demultiplexed into the plurality of monochromatic optical output beams 44 through the combined operation of the plano-convex collimating lens 22, the transmissive diffraction grating 20, and the plano-convex focusing lens 16, at least a portion of the plurality of monochromatic optical output beams 44 are reflected by the transmissive/reflective optical element 52 so that they can then be output to the output fiber coupling device 15 and to the corresponding plurality of optical output fibers 13. Of course, similar to the demultiplexing device 40 shown in FIG. 3, the output fiber coupling device 15 and the plurality of optical output fibers 13 could be replaced in the multiplexing/demultiplexing device 50 by a corresponding plurality of photodetectors 36 secured within a coupling device 38, such as shown in FIG. 2b.

The transmissive/reflective optical element 52 may be either a passive or active optical element. For example, the transmissive/reflective optical element 52 could be a passive beamsplitter having a 45 degree reflecting angle, as shown in FIG. 4. This preserves symmetry and avoids complicating the design of the multiplexing/demultiplexing device 50 as compared to the separate multiplexing device 10 and demultiplexing device 40. That is, the 45 degree reflecting angle preserves the same size as the separate multiplexing device 10 and demultiplexing device 40.

If the transmissive/reflective optical element 52 is a passive beamsplitter, it may have a 50% reflecting/50% transmitting ratio (50/50 ratio), or other reflecting/transmitting ratios may be used. However, this inherently increases the optical loss of the multiplexing/demultiplexing device 50. That is, the inherent 3 dB loss from a 50/50 beamsplitter has the potential for significant improvement.

For instance, the reflection/transmission ratio may be varied depending upon the device and overall system specifications. If, for example, the photodetectors 36 are very sensitive, then a higher portion of light could be transmitted from the laser diodes 32 and a lesser portion of light could be reflected to the photodetectors 36 (e.g., a 75/25 split).

Alternatively, the transmissive/reflective optical element 52 could be an active electrooptical element. For example, a liquid crystal (LC) or photochromic mirror surface could be used to reflect light to the photodetectors 36 (or other outputs) only when needed and otherwise not affect transmission of light from the laser diodes 32. Such active electrooptical elements can be varied from 0 to 100% transmission/reflection by controlling the power to the electrooptical element. This option would avoid the above-described losses associated with the use of a passive beamsplitter for the transmissive/reflective optical element 52. Further, the transmissive/reflective optical element 52 may contain a thin film coating structure which performs a wavelength filtering function. For example, the thin film filter could selectively reflect only certain wavelengths to the photodetectors 36 (or other outputs such as fibers as shown in FIG. 4a). This enables a very low optical loss for the transmissive optical element, because the filter can be appropriately designed to pass light beams from fibers (12) with very low loss for multiplexing on to fiber 26. Similarly, the filter performs a reflective function for demultiplexed beams (from fiber 26) and diverts the beams to output fibers 13 or an array or collection of photodetectors (or other outputs). It should be noted that the filter is wavelength selective. For example, it could let beams with wavelengths below 1550 nm be transmitted left to right (or right to left) through the transmissive/reflective optical element 52 while reflecting wavelengths equal to or above 1550 from right to top (28 to 44).

The transmissive/reflective optical element 52 is typically located near the transmitters and receivers; that is, between the transmitters/receivers and the dispersing element (i.e., the transmissive diffraction grating 20). Also, the transmissive/reflective optical element 52 may transmit/reflect the focused beams 28 and 44 or the collimated beams 28' and 44'. Thus, the transmissive/reflective optical element 52 may be located between the transmitters/receivers and the plano-convex focusing lens 16 (as shown in FIG. 4) or between the plano-convex focusing lens 16 and the reflecting element 18. However, in the latter case, an additional focusing lenses may be required.

Figure 5A:
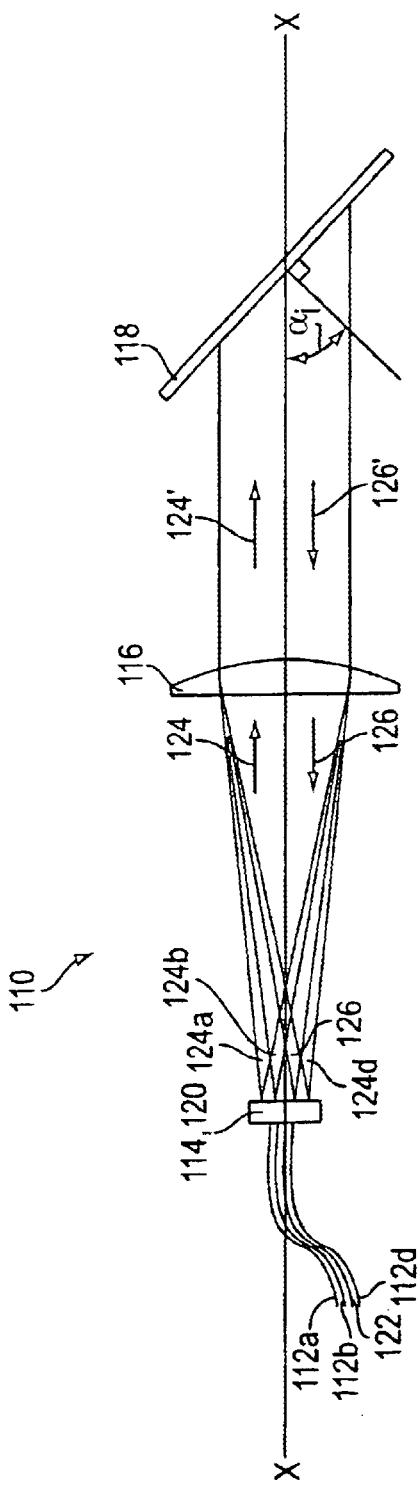
FIG. 5a is a side view of a wavelength division multiplexing device having a plano-convex collimating/focusing lens and a reflective diffraction grating.
Figure 5B:
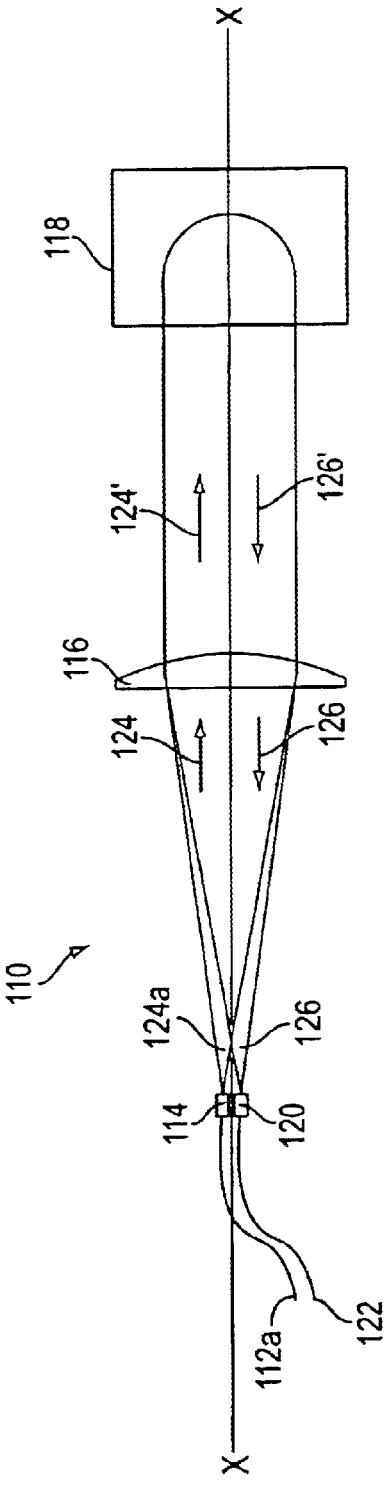

Referring to FIGS. 5a and 5b, there are shown a side view and a top view, respectively, of an embodiment of a wavelength division multiplexing device 110. The multiplexing device 110 comprises a plurality of optical input fibers 112, an input fiber coupling device 114, a plano-convex collimating/focusing lens 116, a reflective diffraction grating 118, an output fiber coupling device 120, and a single optical output fiber 122. All of the above-identified components of the multiplexing device 110 are disposed along an optical axis X—X of the multiplexing device 110, as will be described in more detail below.

Figure 5C:
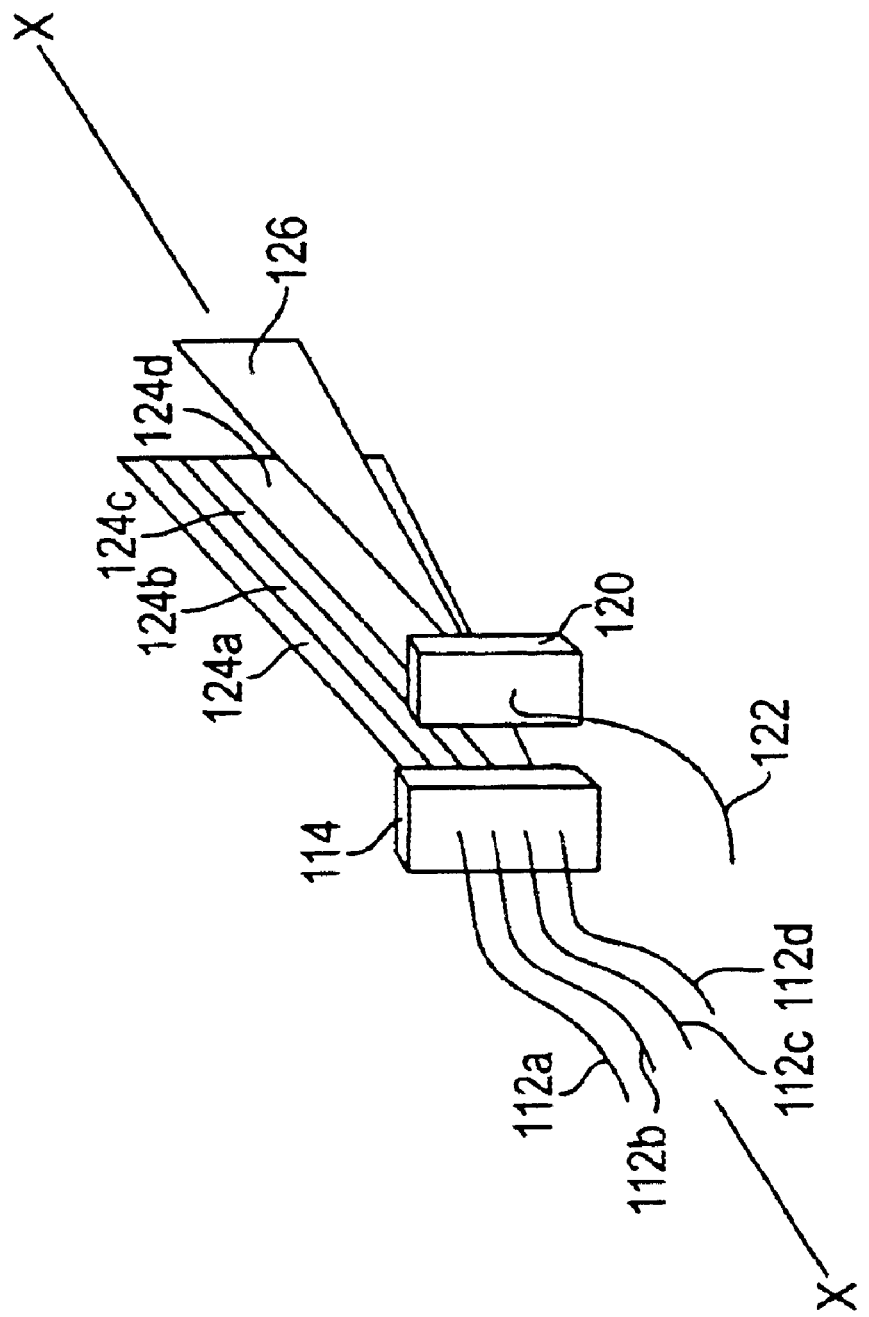

The plurality of optical input fibers 112 are grouped into a one-dimensional input fiber array (i.e., a 1×4 array) by the input fiber coupling device 114, while the single optical output fiber 122 is secured to the output fiber coupling device 120. Both the input fiber coupling device 114 and the output fiber coupling device 120 are used for purposes of ease of optical fiber handling and precision placement, and can be formed of, for example, a silicon V-groove assembly. Referring to FIG. 5c, there is shown a perspective end view of a portion of the multiplexing device 110 revealing how the plurality of optical input fibers 112 are grouped into the one-dimensional input fiber array by the input fiber coupling device 114, and how the single optical output fiber 122 is secured to the output fiber coupling device 120. FIG. 5c also shows a monochromatic optical input beam 124 being transmitted from each of the plurality of optical input fibers 112, and a single multiplexed, polychromatic optical output beam 126 being transmitted to the single optical output fiber 122.

Each of the monochromatic optical input beams 124 being transmitted from the plurality of optical input fibers 112 is carrying a single channel of data at a unique wavelength, which is preferably, but not required to be, within the infrared (IR) region of the electromagnetic spectrum. The single channel of data that is being carried by each monochromatic optical input beam 124 is superimposed on each corresponding unique wavelength by means (e.g., laser diodes connected to the plurality of optical input fibers 112), which are not shown here and which do not form a part of this invention, but are well known in the art. The unique wavelengths of the monochromatic optical input beams 124 are appropriately preselected such that the data channels do not interfere with each other (i.e., there is sufficient channel spacing), and the optical transmission losses through both the optical input fibers 112 and the optical output fiber 122 are low, as is also well known in the art.

The single multiplexed, polychromatic optical output beam 126 being transmitted to the single optical output fiber 122 is carrying a plurality of channels of data at the unique wavelengths of each of the plurality of monochromatic optical input beams 124. The plurality of monochromatic optical input beams 124 are combined into the single multiplexed, polychromatic optical output beam 126 through the combined operation of the plano-convex collimating/focusing lens 116 and the reflective diffraction grating 118, as will be described in more detail below.

At this point it should be noted that the input fiber coupling device 114 and the output fiber coupling device 120 are disposed offset from, but symmetrically about, the optical axis X—X of the multiplexing device 110 so as to insure that the single multiplexed, polychromatic optical output beam 126 is directed to the single optical output fiber 122 secured to the output fiber coupling device 120, and not to any of the plurality of optical input fibers 112 secured to the input fiber coupling device 114, or anywhere else. This offset spacing of the input fiber coupling device 114 and the output fiber coupling device 120 is determined based upon the focusing power of the plano-convex collimating/focusing lens 116, as well as the characteristics of the diffraction grating 118 and the wavelengths of each of the monochromatic optical input beams 124.

Referring again to FIGS. 5a and 5b, each of the plurality of monochromatic optical input beams 124 are transmitted from their corresponding optical input fiber 112 into the air space between the input fiber coupling device 114 and the plano-convex collimating/focusing lens 116. Within this air space, the plurality of monochromatic optical input beams 124 are expanded in diameter until they become incident upon the plano-convex collimating/focusing lens 116. The plano-convex collimating/focusing lens 116 collimates each of the plurality of monochromatic optical input beams 124, and then transmits each collimated, monochromatic optical input beam 124' to the reflective diffraction grating 118.

At this point it should be noted that the optical axis of the plano-convex collimating/focusing lens 116 coincides with the optical axis X—X of the multiplexing device 110 so as to insure that the single multiplexed, polychromatic optical output beam 126 is directed to the single optical output fiber 122 secured to the output fiber coupling device 120, and not to any of the plurality of optical input fibers 112 secured to the input fiber coupling device 114, or anywhere else, as will be described in more detail below.

The reflective diffraction grating 118 operates to angularly disperse the plurality of collimated, monochromatic optical input beams 124' by an amount that is dependent upon the wavelength of each of the plurality of collimated, monochromatic optical input beams 124'. Further, the reflective diffraction grating 118 is oriented at a special angle (i.e., the Littrow diffraction angle, $\alpha_i$) relative to the optical axis X—X of the multiplexing device 110 in order to obtain the Littrow diffraction condition for an optical beam having a wavelength that lies within or near the wavelength range of the plurality of collimated, monochromatic optical input beams 124'. The Littrow diffraction condition requires that an optical beam be incident on and reflected back from a reflective diffraction grating at the exact same angle. Therefore, it will be readily apparent to one skilled in the art that the reflective diffraction grating 118 is used to obtain near-Littrow diffraction for each of the plurality of collimated, monochromatic optical input beams 124'.

The Littrow diffraction angle, $\alpha_i$, is determined by the well-known diffraction grating equation, $$m\lambda = 2d(\sin \alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 110. For example, variables affecting the Littrow diffraction angle, $\alpha_i$, include the desired grating diffraction order, the grating blaze angle, the number of data channels, the spacing of the data channels, and the wavelength range of the multiplexing device 110.

At this point it should be noted that the reflective diffraction grating 118 can be formed from a variety of materials and by a variety of techniques. For example, the reflective diffraction grating 118 can be formed by a three, dimensional hologram in a polymer medium, or by replicating a mechanically ruled master with a polymer material. In both cases, the polymer is overcoated with a thin, highly reflective metal layer such as, for example, gold or aluminum. Alternatively, the reflective diffraction grating 118 can be formed by chemically etching into a planar material such as, for example, glass or silicon, which is also overcoated with a thin, highly reflective metal layer such as, for example, gold or aluminum.

As previously mentioned, the reflective diffraction grating 118 operates to angularly disperse the plurality of collimated, monochromatic optical input beams 124'. Thus, the reflective diffraction grating 118 removes the angular separation of the plurality of collimated, monochromatic optical input beams 124', and reflects a single collimated, polychromatic optical output beam 126' back towards the plano-convex collimating/focusing lens 116. The single collimated, polychromatic optical output beam 126' contains each of the unique wavelengths of the plurality of collimated, monochromatic optical input beams 124'. Thus, the single collimated, polychromatic optical output beam 126' is a single collimated, multiplexed, polychromatic optical output beam 126'. The plano-convex collimating/focusing lens 116 focuses the single collimated, multiplexed, polychromatic optical output beam 126', and then transmits the resulting single multiplexed, polychromatic optical output beam 126 to the output fiber coupling device 120 where it becomes incident upon the single optical output fiber 122. The single multiplexed, polychromatic optical output beam 126 is then coupled into the single optical output fiber 122 for transmission therethrough.

At this point it should be noted that the plurality of optical input fibers 112 could be replaced in the multiplexing device 110 by a corresponding plurality of laser diodes 32 secured within a coupling device 34, such as shown in FIG. 2a. The coupling device 34 performs a similar function to the input fiber coupling device 114, that being to precisely group the plurality of laser diodes 32 into a one-dimensional input array. The plurality of laser diodes 32 are used in place of the plurality of optical input fibers 112 to transmit the plurality of monochromatic optical input beams 124 to the multiplexing device 110. The array of laser diodes 32 may operate alone, or may be used with appropriate focusing lenses to provide the best coupling and the lowest amount of signal loss and channel crosstalk.

At this point it should be noted that the multiplexing device 110, as well as all of the multiplexing devices described herein, may be operated in a converse configuration as a demultiplexing device 140, such as shown in FIGS. 6a and 6b. The demultiplexing device 140 is physically identical to the multiplexing device 110, and is therefore numerically identified as such. However, the demultiplexing device 140 is functionally opposite to the multiplexing device 110. That is, a single multiplexed, polychromatic optical input beam 142 is transmitted from the single optical fiber 122, and a plurality of monochromatic optical output beams 144 are transmitted to the plurality of optical fibers 112, wherein each one of the plurality of monochromatic optical output beams 144 is transmitted to a corresponding one of the plurality of optical fibers 112. The single multiplexed, polychromatic optical input beam 142 is simultaneously carrying a plurality of channels of data, each at a unique wavelength which is preferably, but not required to be, within the infrared (IR) region of the electromagnetic spectrum. The plurality of monochromatic optical output beams 144 are each carrying a single channel of data at a corresponding one of the unique wavelengths of the single multiplexed, polychromatic optical input beam 142. The single multiplexed, polychromatic optical input beam 142 is separated into the plurality of monochromatic optical output beams 144 through the combined operation of the plano-convex collimating/focusing lens 116 and the reflective diffraction grating 118. Thus, the plano-convex collimating/focusing lens 116 and the reflective diffraction grating 118 operate to perform a demultiplexing function.

At this point it should be noted that the plurality of optical fibers 112 could be replaced in the demultiplexing device 140 by a corresponding plurality of photodetectors 36 secured within a coupling device 38, such as shown in FIG. 2b. The coupling device 38 performs a similar function to the fiber coupling device 114, that being to precisely group the plurality of photodetectors 36 into a one-dimensional input array. The plurality of photodetectors 36 are used in place of the plurality of optical fibers 112 to receive the plurality of monochromatic optical output beams 144 from the demultiplexing device 140. The array of photodetectors 36 may operate alone, or may be used with appropriate focusing lenses to provide the best coupling and the lowest amount of signal loss and channel crosstalk.

Figure 7A:
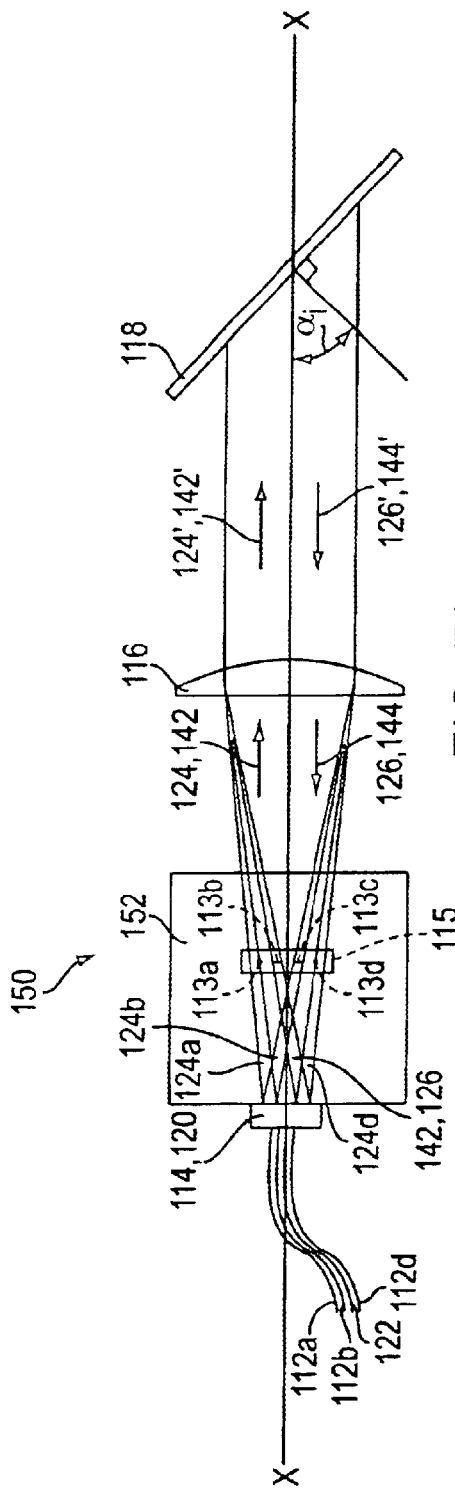
FIG. 7a is a side view of a bi-directional wavelength division multiplexing/demultiplexing device having a plano-convex collimating/focusing lens and a reflective diffraction grating in accordance with the present invention.
Figure 7B:
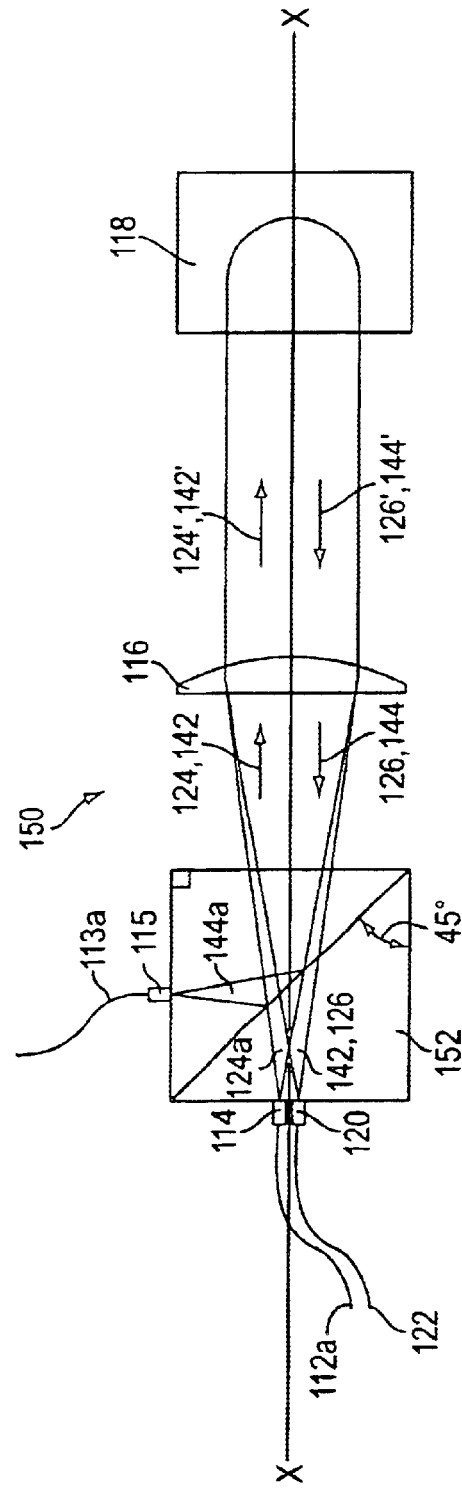

Referring to FIGS. 7a and 7b, there are shown a side view and a top view of an alternate embodiment of a bi-directional wavelength division multiplexing/demultiplexing device 150 in accordance with the present invention. The multiplexing/demultiplexing device 150 is physically identical to the multiplexing device 110 and the demultiplexing device 140, except for the addition of a transmissive/reflective optical element 152, an output fiber coupling device 115, and a plurality of optical output fibers 113.

The transmissive/reflective optical element 152 operates by transmitting at least a portion of the plurality of monochromatic optical input beams 124, thereby allowing the multiplexing/demultiplexing device 150 to function as a multiplexing device. That is, at least a portion of the plurality of monochromatic optical input beams 124 are transmitted through the transmissive/reflective optical element 152 so that they can then be multiplexed into the single multiplexed, polychromatic optical output beam 126 through the combined operation of the plano-convex collimating/focusing lens 116 and the reflective diffraction grating 118. Of course, similar to the multiplexing device 110 shown in FIGS. 5a and 5b, the input fiber coupling device 114 and the plurality of optical input fibers 112 could be replaced in the multiplexing/demultiplexing device 150 by a corresponding plurality of laser diodes 32 secured within a coupling device 34, such as shown in FIG. 2a.

The transmissive/reflective optical element 152 also operates by reflecting at least a portion of the plurality of monochromatic optical output beams 144, thereby allowing the multiplexing/demultiplexing device 150 to function as a demultiplexing device. That is, after the single multiplexed, polychromatic optical input beam 142 has been demultiplexed into the plurality of monochromatic optical output beams 144 through the combined operation of the plano-convex collimating/focusing lens 116 and the reflective diffraction grating 118, at least a portion of the plurality of monochromatic optical output beams 144 are reflected by the transmissive/reflective optical element 152 so that they can then be output to the output fiber coupling device 115 and to the corresponding plurality of optical output fibers 113. Of course; similar to the demultiplexing device 140 shown in FIGS. 6a and 6b, the output fiber coupling device 115 and the plurality of optical output fibers 113 could be replaced in the multiplexing/demultiplexing device 150 by a corresponding plurality of photodetectors 36 secured within a coupling device 38, such as shown in FIG. 2b.

The transmissive/reflective optical element 152 may be either a passive or active optical element. For example, the transmissive/reflective optical element 152 could be a passive beamsplitter having a 45 degree reflecting angle, as shown in FIG. 7b. This preserves symmetry and avoids complicating the design of the multiplexing/demultiplexing device 150 as compared to the separate multiplexing device 110 and demultiplexing device 140. That is, the 45 degree reflecting angle preserves the same size as the separate multiplexing device 110 and demultiplexing device 140.

If the transmissive/reflective optical element 152 is a passive beamsplitter, it may have a 50% reflecting/50% transmitting ratio (50/50 ratio), or other reflecting/transmitting ratios may be used. However, this inherently increases the optical loss of the multiplexing/demultiplexing device 150. That is, the inherent 3 dB loss from a 50/50 beamsplitter has the potential for significant improvement. For instance, the reflection/transmission ratio may be varied depending upon the device and overall system specifications. If, for example, the photodetectors 36 are very sensitive, then a higher portion of light could be transmitted from the laser diodes 32 and a lesser portion of light could be reflected to the photodetectors 36 (e.g., a 75/25 split).

Alternatively, the transmissive/reflective optical element 152 could be an active electrooptical element. For example, a liquid crystal (LC) or photochromic mirror surface could be used to reflect light to the photodetectors 36 (or other outputs) only when needed and otherwise not affect transmission of light from the laser diodes 32. Such active electrooptical elements can be varied from 0 to 100% transmission/reflection by controlling the power to the electrooptical element. This option would avoid the above-described losses associated with the use of a passive beam-splitter for the transmissive/reflective optical element 152.

The transmissive/reflective optical element 152 is typically located near the transmitters and receivers; that is, between the transmitters/receivers and the dispersing element (i.e., the reflective diffraction grating 118). Also, the transmissive/reflective optical element 152 may transmit/reflect the focused/expanded beams 124, 126, 142, and 144 or the collimated beams 124', 126', 142', and 144l. Thus, the transmissive/reflective optical element 152 may be located between the transmitters/receivers and the plano-convex collimating/focusing lens 116 (as shown in FIGS. 7a and 7b) or between the plano-convex collimating/focusing lens 116 and the reflective diffraction grating 118. However, in the latter case, an additional focusing lens may be required.

At this point it should be noted that it is within the scope of the present invention to provide a bi-directional wavelength division multiplexing/demultiplexing device in accordance with the present invention using any or all of the concepts and/or features described in U.S. patent application Ser. No. 09/257,045, filed Feb. 25, 1999; U.S. patent application Ser. No. 09/323,094, filed Jun. 1, 1999; U.S. patent application Ser. No. 09/342,142, filed Jun. 29, 1999; U.S. patent application Ser. No. 09/382,492, filed Aug. 25, 1999; U.S. patent application Ser. No. 09/382,624, filed Aug. 25, 1999; U.S. patent application Ser. No. 09/363,041, filed Jul. 29, 1999; U.S. patent application Ser. No. 09/363,042, filed Jul. 29, 1999; U.S. patent application Ser. No. 09/392,670, filed Sep. 8, 1999; and U.S. patent application Ser. No. 09/392,831, filed Sep. 8, 1999; all of which are hereby incorporated herein by reference. For example, a bi-directional wavelength division multiplexing/demultiplexing device in accordance with the present invention may be wholly or partially integrated, and different types of lenses and lens configurations may be used.

The present invention concept of integrating a transmissive/reflective optical element into any one of a number of existing multiplexing/demultiplexing devices allows a significant increase in the function of the devices by enabling bi-directionality in a single WDM device. This concept is particularly useful both for LAN and high volume, high channel count (e.g., long-haul transport) applications where bi-directionality, low cost, small size, and low loss are needed. The addition of the transmissive/reflective optical element adds little cost to a WDM device, but enables a nearly 50% reduction in overall size of a WDM device. The low cost achievable by using only one WDM device instead of two increases the chances of a successful entry into the LAN WDM market.

At this point it should be noted that while the transmissive/reflective optical elements 52 and 152 described herein have 45 degree angles, the present invention is not limited in this regard. For example, there may be more optimal angles based up the exact wavelengths used. Further, it may be very advantageous to use the angle of the transmissive/reflective optical element to compensate for inherent polarization dependent loss (PDL) in the diffraction grating. It is ideal to minimize PDL to increase the usefulness of the device and the overall performance of the optical transmission system.

In summary, the new and specific advantages obtained with the present invention include: 1.) bi-directional multiplexing/demultiplexing capabilities in a single WDM device; 2.) lower cost of a WDM system by having only one WDM device instead of two to provide multiplexing/demultiplexing capabilities; 3.) smaller WDM system package size; 4.) less complex WDM system package; and 5.) less coupling/connector loss than a separate (external) splitter between the rest of the network and the multiplexing/demultiplexing devices of the WDM system.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A bi-directional wavelength division multiplexing/demultiplexing device comprising:

a diffraction grating for combining a plurality of monochromatic optical input beams into a multiplexed, polychromatic optical output beam, and for separating a multiplexed, polychromatic optical input beam into a plurality of monochromatic optical output beams; and a transmissive/reflective optical element for transmitting the plurality of monochromatic optical input beams on an optical path toward the diffraction grating, and for reflecting the plurality of monochromatic optical output beams received on an optical path from the diffraction grating.

2. The device as defined in claim 1, wherein the diffraction grating is a transmissive diffraction grating.

3. The device as defined in claim 2, further comprising:

a first collimating/focusing lens for collimating the plurality of monochromatic optical input beams, and for focusing the multiplexed, polychromatic optical output beam; and a second collimating/focusing lens for collimating the multiplexed, polychromatic optical input beam, and for focusing the plurality of monochromatic optical output beams.

4. The device as defined in claim 3, wherein the transmissive/reflective optical element is located opposite one of the first collimating/focusing lens and the second collimating/focusing lens from the diffraction grating.

5. The device as defined in claim 3, wherein the transmissive/reflective optical element is located between the diffraction grating and one of the first collimating/focusing a lens and the second collimating/focusing lens.

6. The device as defined in claim 1, wherein the diffraction grating is a reflective diffraction grating.

7. The device as defined in claim 6, further comprising:

a collimating/focusing lens for collimating the plurality of monochromatic optical input beams and the multiplexed, polychromatic optical input beam, and for focusing the multiplexed, polychromatic optical output beam and the plurality of monochromatic optical output beams, respectively.

8. The device as defined in claim 7, wherein the transmissive/reflective optical element is located opposite the collimating/focusing lens from the diffraction grating.

9. The device as defined in claim 7, wherein the transmissive/reflective optical element is located between the diffraction grating and the collimating/focusing lens.

10. The device as defined in claim 1, wherein the transmissive/reflective optical element is one of a passive optical element and an active optical element.

11. The device as defined in claim 10, wherein the transmissive/reflective optical element is a passive beamsplitter.

12. The device as defined in claim 11, wherein the passive beamsplitter has a 45 degree reflecting angle.

13. The device as defined in claim 12, wherein the passive beamsplitter has a fixed transmission/reflection ratio.

14. The device as defined in claim 10, wherein the transmissive/reflective optical element is an active electrooptical element.

15. The device as defined in claim 14, wherein the active electrooptical element has a 45 degree reflecting angle.

16. The device as defined in claim 15, wherein the active electrooptical element has a variable transmission/reflection ratio.

17. A bi-directional wavelength division multiplexing/demultiplexing device comprising:

a diffraction grating for combining a plurality of monochromatic optical input beams into a multiplexed, polychromatic optical output beam, and for separating a multiplexed, polychromatic optical input beam into a plurality of monochromatic optical output beams; and a transmissive/reflective optical element for reflecting the plurality of monochromatic optical input beams on an optical path toward the diffraction grating, and for transmitting the plurality of monochromatic optical output beams received on an optical path from the diffraction grating.

18. The device as defined in claim 17, wherein the diffraction grating is a transmissive diffraction grating.

19. The device as defined in claim 18, further comprising:

a first collimating/focusing lens for collimating the plurality of monochromatic optical input beams, and for focusing the multiplexed, polychromatic optical output beam; and a second collimating/focusing lens for collimating the multiplexed, polychromatic optical input beam, and for focusing the plurality of monochromatic optical output beams.

20. The device as defined in claim 19, wherein the transmissive/reflective optical element is located opposite one of the first collimating/focusing lens and the second collimating/focusing lens from the diffraction grating.

21. The device as defined in claim 19, wherein the transmissive/reflective optical element is located between the diffraction grating and one of the first collimating/focusing lens and the second collimating/focusing lens.

22. The device as defined in claim 17, wherein the diffraction grating is a reflective diffraction grating.

23. The device as defined in claim 22, further comprising:

a collimating/focusing lens for collimating the plurality of monochromatic optical input beams and the multiplexed, polychromatic optical input beam, and for focusing the multiplexed, polychromatic optical output beam and the plurality of monochromatic optical output beams, respectively.

24. The device as defined in claim 23, wherein the transmissive/reflective optical element is located opposite the collimating/focusing lens from the diffraction grating.

25. The device as defined in claim 23, wherein the transmissive/reflective optical element is located between the diffraction grating and the collimating/focusing lens.

26. The device as defined in claim 17, wherein the transmissive/reflective optical element is one of a passive optical element and an active optical element.

27. The device as defined in claim 26, wherein the transmissive/reflective optical element is a passive beamsplitter.

28. The device as defined in claim 27, wherein the passive beamsplitter has a 45 degree reflecting angle.

29. The device as defined in claim 28, wherein the passive beamsplitter has a fixed transmission/reflection ratio.

30. The device as defined in claim 26, wherein the transmissive/reflective optical element is an active electrooptical element.

31. The device as defined in claim 30, wherein the active electrooptical element has a 45 degree reflecting angle.

32. The device as defined in claim 31, wherein the active electrooptical element has a variable transmission/reflection ratio.

* * * * *